US008997156B2

(12) United States Patent
Newell et al.

(10) Patent No.: US 8,997,156 B2
(45) Date of Patent: Mar. 31, 2015

(54) SYSTEMS AND METHODS FOR DISTRIBUTING USER GENERATED CONTENT

(75) Inventors: Nicholas Newell, Highlands Ranch, CO (US); Markus Wayne Jackson, Castle Rock, CO (US)

(73) Assignee: EchoStar Technologies LLC, Englewood, CO (US)

( * ) Notice: Subject to any disclaimer, the term of this patent is extended or adjusted under 35 U.S.C. 154(b) by 335 days.

(21) Appl. No.: 12/615,028

(22) Filed: Nov. 9, 2009

(65) Prior Publication Data

US 2011/0113454 A1    May 12, 2011

(51) Int. Cl.
*H04N 7/173* (2011.01)
*H04N 7/16* (2011.01)
*G06F 3/00* (2006.01)
*H04N 7/20* (2006.01)
*H04N 21/61* (2011.01)
*H04N 21/2668* (2011.01)
*H04N 21/2743* (2011.01)
*H04N 21/475* (2011.01)

(52) U.S. Cl.
CPC ....... *H04N 21/6143* (2013.01); *H04N 7/17318* (2013.01); *H04N 21/2668* (2013.01); *H04N 21/2743* (2013.01); *H04N 21/4756* (2013.01)
USPC ............... 725/63; 725/24; 725/28; 725/46; 725/97

(58) Field of Classification Search
None
See application file for complete search history.

(56) References Cited

U.S. PATENT DOCUMENTS

| 2004/0123318 | A1* | 6/2004 | Lee et al. .......... 725/46 |
| 2005/0198672 | A1* | 9/2005 | Ikeda .............. 725/62 |
| 2006/0015657 | A1* | 1/2006 | Boehm et al. ...... 710/8 |
| 2007/0038931 | A1 | 2/2007 | Allaire et al. |
| 2007/0089149 | A1 | 4/2007 | You |
| 2008/0077959 | A1* | 3/2008 | Kirimura et al. ..... 725/46 |
| 2009/0077959 | A1 | 3/2009 | Wrona et al. |
| 2009/0164559 | A1 | 6/2009 | Johnson et al. |
| 2009/0183213 | A1* | 7/2009 | Mukerji et al. ....... 725/95 |
| 2011/0191163 | A1* | 8/2011 | Allaire et al. ........ 705/14.39 |

FOREIGN PATENT DOCUMENTS

| WO | WO 2007/103655 A | 9/2007 |
| WO | WO2009082487 | 7/2009 |

OTHER PUBLICATIONS

International Search Report for PCT/US10/55926 mailed on February 15, 2011.
European Office Action received on Jul. 4, 2013 for EP 10795105.5 (002000EP), 8 pages.
Office Action dated Nov. 12, 2014 for Mexican Patent Application No. MX/a/2012/005353, is not translated into the English, 4 pages.

* cited by examiner

*Primary Examiner* — Brian T Pendleton
*Assistant Examiner* — Jean D Saint Cyr
(74) *Attorney, Agent, or Firm* — Kilpatrick Townsend & Stockton LLP

(57) ABSTRACT

A television provider receives content from a plurality of users. The user generated content is aggregated and scheduled for broadcast across a channel of the television provider. The user generated content is then broadcast at the scheduled time for reception by communication devices associated with the television provider.

11 Claims, 7 Drawing Sheets

PEOPLE DOING STUPID THINGS (Jan. 1ˢᵗ - 7:00 TO 8:30 P.M.)

| | | |
|---|---|---|
| Bear Wrestling<br>by bearWrestlingFanatic | 7:00 P.M. | RECORD |
| Shopping Cart Racing<br>by tommy | 7:05 P.M. | RECORD |
| Staircase Skiing<br>by funnyguy | 7:07 P.M. | RECORD |
| Pickax Baseball<br>by partyguyz | 7:08 P.M. | RECORD |
| Bicycle Jumps<br>by BMX Madness | 7:13 P.M. | RECORD |
| Cow Tipping<br>by cityBoy | 7:17 P.M. | RECORD |
| Birthday Party Piñata Time<br>by greatestMom | 7:18 P.M. | RECORD |
| Me Running on the Field During Football Game<br>by whatWasIThinking | 7:20 P.M. | RECORD |
| Scaring Little Kids at Halloween<br>by imAJerk | 7:22 P.M. | RECORD |

*FIG. 6*

SYSTEMS AND METHODS FOR DISTRIBUTING USER GENERATED CONTENT

BACKGROUND

Content distribution systems, such as broadcast television networks, are typically closed to independently created content, such as independent films and user generated content. Thus, most independent content is distributed instead over the internet through various web portals. While these web portals are available worldwide, they do not have the same ease of use as watching content on television. Moreover, unless a person is specifically looking for a type of independent content, it is unlikely that the user will find such content through the aforementioned web portals. Thus, it would be desirable to allow distribution of independently created content over standard television communication networks, such as cable, satellite, internet protocol television (IPTV) and/or terrestrial over-the-air (OTA) systems.

BRIEF DESCRIPTION OF THE DRAWINGS

The same number represents the same element or same type of element in all drawings.

FIG. 6 illustrates an embodiment of a schedule outputted by the control logic of FIG. 4.

DETAILED DESCRIPTION

Figure 1:
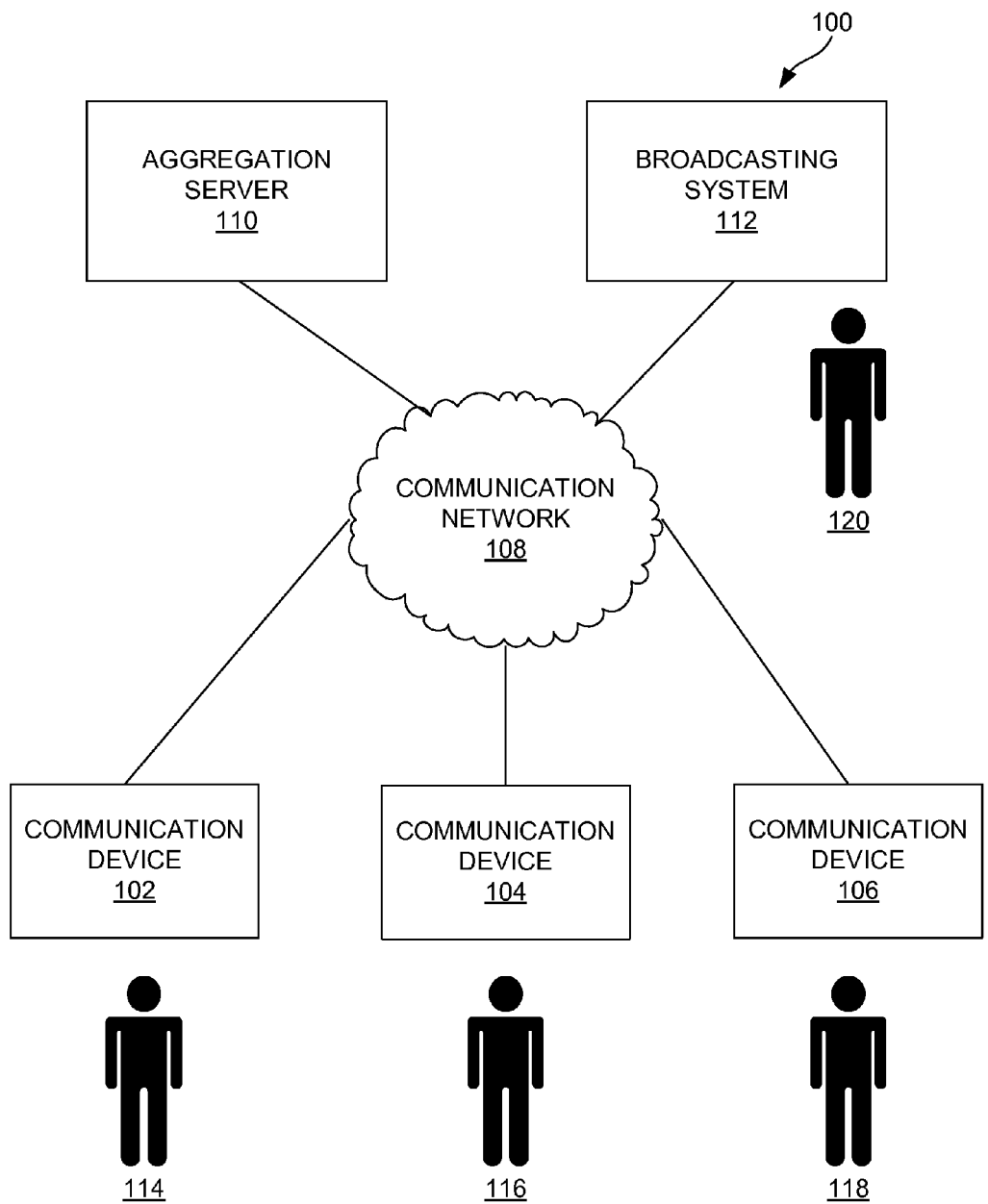
FIG. 1 illustrates an embodiment of a distribution system.

The various embodiments described herein generally provide apparatus, systems and methods which facilitate the reception, processing, outputting and communication of content from one or more sources, via one or more communications mediums (or networks), to one or more communication devices for presentation to one or more end-users.

In at least one embodiment, the content to be received, processed, outputted and/or communicated may come in any of various forms including, but not limited to, audio, video, data, information, or otherwise. As used herein, "content" refers to information communicated via a media (e.g., on a web page or otherwise) without concern as to the design, placement or layout of the information on the media. Further, as used herein, "user generated content" generally refers to various kinds of content produced by end-users (e.g., television viewers), as opposed to traditional media producers such as professional writers, publishers, journalists, licensed broadcasters and production companies. As used herein, user generated content may include independent films and other content created by independent media outlets. By contrast, as used herein, "media content" generally refers to content produced by the traditional media producers rather than end-users. It is to be appreciated, however, that "content," regardless of whether "user generated", "media content" or otherwise, includes videos, video clips, photographs, sound recordings, text files, graphical images and the like or any combination thereof.

In at least one embodiment, an aggregation server receives content from a plurality of users. The content may have similar characteristics (e.g., a similar genre, subject and the like) or may be dissimilar, depending on desired design criteria. The aggregation server processes the received content and identifies a broadcast time for each of the content files. The broadcast time may be identified based on various factors, such as the subject/genre of the content, the author of the content, length of the content and the like. The aggregation server then transmits the content to a distribution system for broadcast over a communication network at the identified broadcast time for each piece of content.

In at least one embodiment, user generated content may be broadcast by a service provider on a dedicated channel of a service. For example, a satellite television provider may dedicate one or more linear channels of their service for presentation of user generated content. User generated content is received from various viewers and broadcast over the satellite network to client terminals of the satellite network for viewing by users. In at least one embodiment, an employee of the provider screens received content to filter objectionable material prior to broadcasting.

In some embodiments, user generated content may be interspersed within traditional media content. For example, a satellite provider may offer channels which include some media content, such as short clips, news stories and the like which are broadcast interspersed with various user generated content. In at least one embodiment, user generated content may be broadcast on a channel interspersed with commercials or other types of advertising content. For example, advertising banners may be overlaid onto a bottom portion of the screen during broadcast of the user generated content.

FIG. 1 illustrates an embodiment of a distribution system 100. In this embodiment, the distribution system 100 is configured to receive, combine, output and communicate content to end-users. None, some or all of the content communicated to end-users can be "user generated content" or information based thereon. Further, none, some or all of the content can be "media content" or information based thereon. The distribution system 100 includes communication devices 102, 104, 106, a communication network 108, an aggregation server 110 and a broadcasting system 112. The distribution system 100 may include other components, elements or devices not illustrated for the sake of brevity.

As illustrated in FIG. 1, each user 114, 116 and 118 utilizes one or more communication devices 102, 104 and 106 to receive content from the broadcasting system 112 via the communication network 108. Examples of communication devices include, but are not limited to, televisions, television receivers (e.g., cable, satellite, IPTV or terrestrial set-top boxes) computers, personal digital assistants (PDAs), other computing devices, and/or mobile communication devices (e.g., mobile or wireless telephones). Communication devices 102, 104 and 106 may provide for receive capability only (e.g., televisions, television receivers, stereo systems), receive and transmit capabilities (e.g., bidirectional television receivers, wireless telephones, wired telephones, computers, two-way radios, and WiFi PDAs), or transmission only capabilities (e.g., video or still cameras and audio recording devices). Communication devices may be combined, as desired, to provide any combination of receive and/or transmit communication capabilities.

Distribution system 100 also includes one or more communication networks 108. The communication network 108 may utilize any desired combination of wired (e.g., cable and fiber) and/or wireless (e.g., cellular, wireless, satellite, microwave, and radio frequency) communication mediums and any desired network topology (or topologies when multiple mediums are utilized). Further, any given user 114, 116 and 118 may utilize one or more communication networks to receive and/or transmit content by and between the aggregation server 110 and/or the broadcasting system 112. Exemplary communication networks include television distribution networks (e.g., satellite, cable, OTA and IPTV television networks), wireless communication networks, public switched telephone networks (PSTN), and local area networks (LAN) or wide area networks (WAN) providing data communication services.

Aggregation server 110 is operable for receiving content from one or more of communication devices 102, 104 and 106. In at least one embodiment, aggregation server 110 is operable for receiving various forms and types of user generated content such as polling data, user generated and/or provided videos, demographic data, user preferences, user opinions, statistical data, and the like. The aggregation server 110 is further operable to identify which received content is to be broadcast by the broadcasting system 112 over one or more channels of the broadcasting system 112. In at least one embodiment, the aggregation server 110 may schedule broadcast times for content which is to be broadcast by the broadcasting system 112.

Each of the communication devices 102, 104 and 106 may comprise any type of device capable of transmitting content and/or receiving content and presenting content to a user 114, 116 and 118 or outputting received content to an associated presentation device for presentation to a user 114, 116 and 118. For example, each of communication devices 102, 104 and/or 106 may comprise a television receiver (e.g., cable, satellite, IPTV or OTA) that receives television signals and responsively outputs audio/video content to an associated television or other type of display device. In at least one embodiment, any of the communication devices 102, 104 and/or 106 may be operable to provide content to the aggregation server 110, but may not be able to receive content from the broadcasting system 112. For example, the communication device 102 may be a computer that uploads content to the aggregation server 110 via the internet, but may be unable to receive content broadcast over a television network. Likewise, a communication device 102, 104 and 106 may be able to receive content but may be unable to transmit content to the aggregation server 110. For example, the communication device 104 may comprise a satellite television receiver that receives content from the communication network 108 but that does not include a back channel to communicate data back to the aggregation server 110 and/or the broadcasting system 112.

The identification of which content is to be broadcast may be performed automatically, semi-automatically or manually (e.g., based upon user input or direction). For example, an operator 120 may manually review received content to approve/deny such received content for distribution by the broadcasting system 112. In at least one embodiment, the aggregation server 110 may identify which content to transmit automatically based upon attributes associated with the content. For example, content relating to a certain subject or genre or created by a certain individual may be automatically approved for distribution by the broadcasting system 112. In at least one embodiment, the aggregation server 110 may provide uploaded videos over the internet through a web interface where visitors can provide feedback regarding the videos. Such feedback may be utilized to determine which videos are to be distributed by the broadcasting system 112 and/or the broadcast time of such videos.

The aggregation server 110 transmits the content identified for broadcast to the broadcasting system 112. The broadcasting system 112 is operable to communicate the content to one or more communication devices 102, 104 and 106 via one or more communication networks 108. It is to be appreciated that the users receiving the communicated content from the broadcasting system 112 can be the same or different than those users providing the information to the aggregation server 110.

For example, the aggregation server 110 may be configured to receive information from a first user 114 via a first communication device 102 (e.g., a mobile telephone) and may initiate communication of the content to users 116 and 118 through the communication devices 104 and 106 (e.g., satellite or cable receivers). In at least one embodiment, a first user 114 may transmit content to the aggregation server 110 via the first communication device 102 (e.g., a satellite television receiver), but such content may be distributed to other satellite television receivers (e.g., communication devices 104 and 106) and may not be distributed to the communication device 102. For example, the communication device 102 may not be capable of receiving data from a satellite of the communication network 108 utilized by the broadcasting system 112 to transmit the content on a particular channel of the satellite provider's service. In at least one embodiment, the aggregation server 110 may receive content from one or more computers and may initiate distribution of the content over a television distribution network to various television receivers.

In at least one embodiment, content aggregated by the aggregation server 110 may be transmitted through a plurality of broadcasting systems 112. For example, content may be transmitted over a satellite television network, a cable television network and a wireless telephone network simultaneously. The format of the content presented on each of the communication devices 102, 104 and 106 may differ depending on the presentation capabilities of each device. For example, communication devices 102 and 104 (e.g., satellite television receivers) can be configured to receive standard definition and/or high definition video from aggregation server 110, while the communication device 106 (e.g., a mobile telephone) may receive reduced resolution video from aggregation server 110.

In at least one embodiment, the aggregation server 110 is operable to format received content as appropriate for transmission across various networks. For example, the aggregation server 110 may format content for transmission across a wireless network to fit the screen resolution of the mobile device. In at least one embodiment, the aggregation server 110 transcodes content from a received format (e.g., Windows Media) into a format utilized by the broadcasting system 112 (e.g., MPEG-4).

The selection process of content transmitted by the broadcasting system 112 may be performed based on desired design criteria, such as subject/genre of the content, time limits imposed on television programming, bandwidth capabilities of distribution network 100, or storage limitations associated with the communication devices 102, 104 and 106. In at least one embodiment, a television provider may utilize various monetary models to determine which user generated content to broadcast. For example, the aggregation server 110 may select content based on a pay-model, such as set prices for particular time slots/channels or an auction bidding model that places high bid requests at more desirable time slot and/or channels.

Other types of rating schemes may also be utilized to select content for viewing based on monetary considerations as well as other factors when selecting content for viewing. For example, the aggregation server 110 may receive feedback regarding various user generated content that is broadcast and may generate a creator rating based on the feedback. The creator rating may be used to prioritize content uploaded to the aggregation server 110 for transmission. In at least one embodiment, a user with a lower creator rating may obtain a higher priority by paying a larger monetary consideration such that their content will be transmitted in a more desirable time slot than a user with a higher creator rating that does not pay the same monetary consideration. It is to be appreciated that other content ranking and selection techniques may be utilized in accordance with the distribution techniques described herein.

In at least one embodiment, the broadcasting system 112 may broadcast content identified for distribution by the aggregation server 110 over a channel of a television distribution network. For example, a satellite television provider may dedicate one or more channels of its service for distributing independent film or user generated content. The scheduling of content on a channel may be determined based on desired design criteria. For example, content may be grouped together according to subject or genre. Thus, a particular time slot (e.g., 7:00 PM to 8:00 P.M.) may be dedicated to clips related to a specific subject. Another time slot (e.g., 8:00 P.M. to 9:00 P.M.) may show clips related to a different subject.

In at least one embodiment, the scheduled times of specific content may be determined based on a length of the content. For example, the afternoon time slots of the channel may be dedicated to short clips (e.g., 10 minutes in length or less) whereas primetime slots may be dedicated to full length movies (e.g., several hours in length). In at least one embodiment, the broadcast time of particular content may be based on a priority assigned to the content.

For example, priorities may be assigned to content based on various attributes of the content, such as length, subject or author. In some embodiments, priority may be based upon a payment model, where payment of a higher fee allows the content to be assigned a higher priority. Certain time slots are more desirable than other (e.g., primetime time slots are better than timeslots in the middle of the night). Thus, the aggregation server 110 may assign broadcast times that are more desirable to higher priority programming. In at least one embodiment, a user 114, 116 or 118 may request a specific time slot for broadcasting of their content. If the time slot is available, then the aggregation server 110 may assign the requested timeslot to the content. In at least one embodiment, if the timeslot has been requested by multiple users, then the aggregation server 110 may resolve the conflict according to a priority scheme as described above.

In at least one embodiment, a user 114, 116 or 118 may transmit content to the aggregation server 110 in association with a contact list. The contact list may identify other users via any type of identifier, such as name, username, phone number, email address, communication device identifier, MAC address or the like. After identifying a broadcast time for the content, the aggregation server 110 may transmit messages to communication devices of each member of the contact list, indicating the broadcast time of the program.

The messages may be transmitted to the same device or a different device than the members of the contact list would utilize to view the content at the indicated broadcast time. For example, messages may be sent to television receivers of the members of the contact list. In at least one embodiment, a television receiver may provide a prompt informing a user regarding the broadcast time for the content. The user may then decide whether to watch such content. In at least one embodiment, the message may specify a recording command to the television receiver. The recording command may thus responsively record the program for later viewing by a user. For example, a program may be broadcast when the members of the contact list are unlikely to be watching television, e.g., the middle of the night. However, the television receiver will record the program for subsequent viewing. The recording command may be executed automatically by the television receiver or may prompt the user to accept the recording command, depending on desired design criteria.

In at least one embodiment, a message initiated by the aggregation server 110 may be delivered to a communication device that is different than what a member of the contact list would utilize to receive the broadcasted content. For example, a user may receive broadcasted content via a television receiver (e.g., cable or satellite). However, the message informing the user of the broadcast time of the content may be sent via email to the user's computer or via text to the user's mobile telephone.

In at least one embodiment, the aggregation server 110 stores preferences regarding various users, such as their preferred contact method. Thus, when a user 114, 116 or 118 uploads content and provides a contact list, the aggregation server 110 may determine the appropriate method for contacting each user of the contact list. For example, some users may prefer to be notified via text or email, whereas other users may prefer to be notified via a reminder displayed on their television receiver. Some users may prefer that the television receiver automatically record content created by their friends, whereas other users may desire to have an option to approve/reject the recording of their friend's content.

Figure 2:
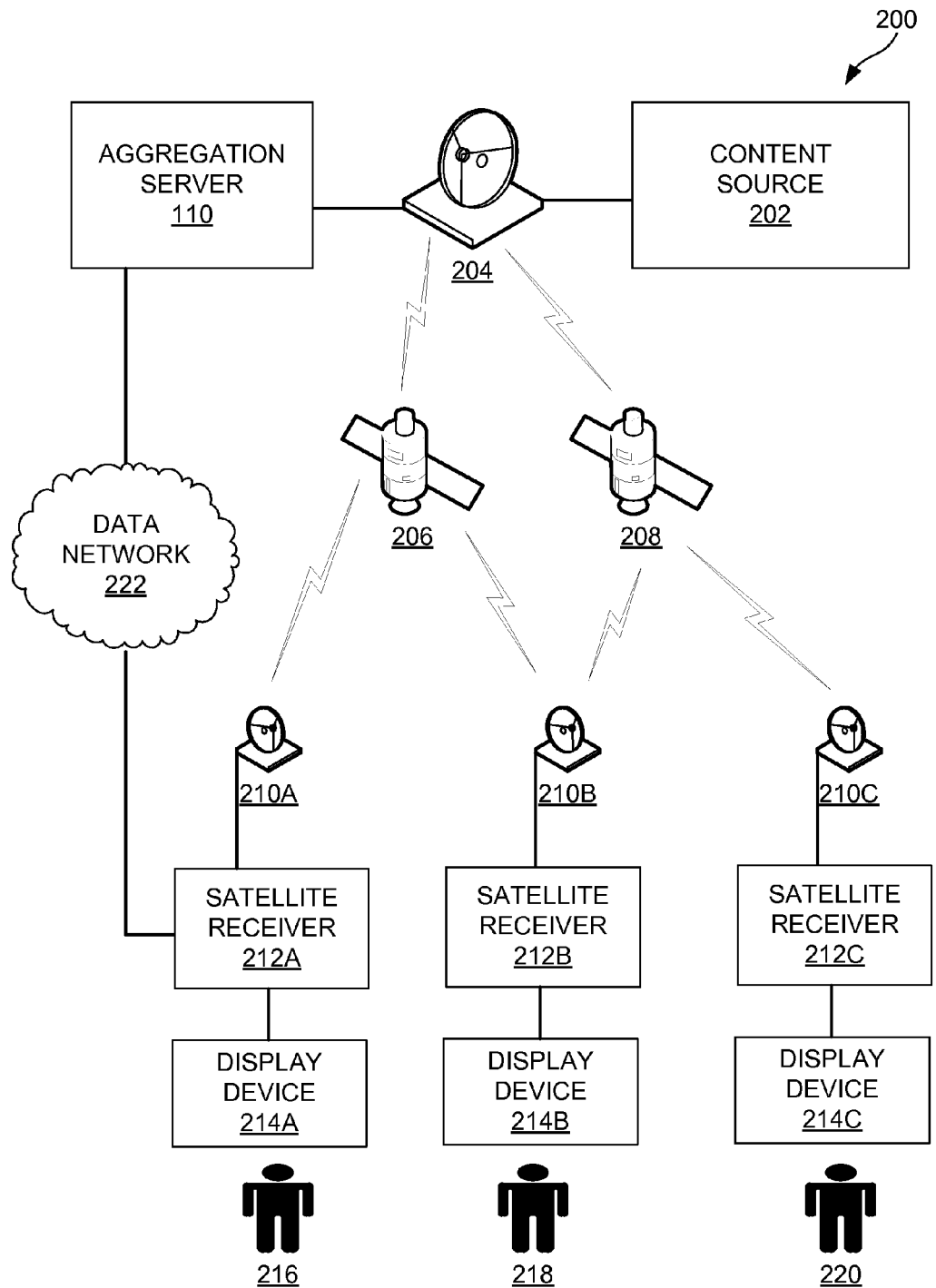
FIG. 2 illustrates an embodiment of a satellite distribution network.

FIG. 2 illustrates an embodiment of a satellite distribution network 200. The satellite distribution network 200 includes an aggregation server 110, a content source 202, an uplink system 204, two satellites 206 and 208, satellite antennas 210A, 210B and 210C, satellite receivers 212A, 212B and 212C, display devices 214A, 214B and 214C and data network 222. Each of these components is discussed in greater detail below. The satellite distribution network 200 may include other components, elements or devices not illustrated for the sake of brevity and the further discussion of components common to FIG. 1 is omitted.

The content source 202 is operable for receiving and/or generating content for communication to one or more satellite receivers 212A-212C. The content to be received, processed, outputted and/or communicated may come in any of various forms including, but not limited to, audio, video, data, information, or otherwise. In at least one embodiment, the content source 202 is operable for receiving various forms and types of content from other sources, aggregating the content and initiating transmission of the content via the satellites 206-208 to the satellite receivers 212A-212C. It is to be appreciated that the content source 202 may receive practically any form and/or type of information from one or more sources including streaming television programming, recorded audio or video, electronic programming guide data and the like.

The uplink system 204 receives content from the content source 202 and/or the aggregation server 110 and uplinks the received content to one or more satellites 206 and 208. The satellites 206 and 208 are configured to receive the uplinked content and transmit the content to one or more satellite antennas 210A-210C. The content transmitted by satellites 206 and 208 may be the same or different depending on desired design criteria. For example, a satellite television provider may operate a fleet of satellites 206 and 208, each carrying different channels of content. Thus, each satellite antenna 210A-210C receives the channels carried by the satellites 206 and 208 for which the satellite antenna 210A-210C has a line of site to the corresponding orbital location. Some content/channels may be duplicated across multiple satellites, whereas other content/channels may be carried exclusively on one satellite 206 or 208.

As illustrated in the embodiment of FIG. 2, the satellite antenna 210A receives content from the satellite 206. The satellite antenna 210B is capable of receiving content from both satellites 206 and 208 and the satellite antenna 210C is capable of receiving content from the satellite 208. Thus, the satellite antenna 210A does not receive a signal from satellite 208 and similarly, the satellite antenna 210C does not receive a signal from satellite 206. The satellite receivers 212A-212C are communicatively coupled to the satellite antennas 210A-210C, respectively, and are configured to receive satellite signals and tune/decode selected programming for output to an associated display device 214A-214C for viewing by the users 216, 218 and 220.

As illustrated in FIG. 2, the satellite receiver 212A is communicatively coupled to the aggregation server 110 through the data network 222. Thus, the satellite receiver 212A is capable of uploading content to the aggregation server 110. For example, the satellite receiver 212A may be coupled to a video camera that captures audio/video data. The user 216 may provide input instructing the satellite receiver 212A to upload the audio/video data to the aggregation server 110. The aggregation server 110 processes the received audio/video data and provides the content to the uplink system 204 for transmission to one or more of the satellites 206 and 208. At least one of the satellites 206 and 208 receives the content from the uplink system 204 and transmits the content to one or more of the satellite receivers 212A-212C.

As previously described, the satellite receiver 212A is not capable of receiving content transmitted by the satellite 208. Thus, if the uplink system 204 transmits the content uploaded by the user 216 to the satellite 208 for transmission, then the user 216 will be unable to view the content, as the satellite antenna 210A does not receive content from the satellite antenna 208. However, the users 218 and 220 will both have the ability to view the content uploaded by the user 216.

In some situations, the user 216 may desire for their content to be transmitted via a satellite 206, 208 from which they are unable to receive content. For example, the user 216 may be located in Alaska and may receive content from the satellite 206 at the 148° orbital location. Signals from satellite 206 are not available in the Eastern half of the United States. However, the satellite 208 may be located at the orbital location 61.5°, which is available in most of the United States, but particularly not in Alaska. Thus, if the user 216 desires for their content to be broadcast to the widest audience, then satellite 208 is more desirable to the user 216 for transmission of the content than satellite 206

However, the user 216 may desire for their content to be transmitted via a satellite 206, 208 from which the satellite receiver 212A can receive content. Thus, in at least one embodiment, the satellite receiver 212A may upload supplemental information to the aggregation server, in association with the content generated by the user 216, identifying from which of the satellites 206 and 208 that the satellite receiver 212A can receive content. For example, the supplemental information may identify that the satellite receiver 212A is capable of receiving content from satellite 206 but not satellite 208. In at least one embodiment, the supplemental information may be embodied as a switch matrix associated with the satellite receiver 212A.

The aggregation server 212 processes the supplemental information to select an appropriate channel for broadcast of the user generated content. For example, the satellite 206 may carry a first linear channel of user generated content and the satellite 208 may carry a second linear channel of user generated content. The aggregation server 212 processes the supplemental information and selects the first channel for broadcast of the user generated content from the user 216. Thus, the user 216 will be able to see their own programming broadcast through the satellite network to their satellite receiver 212A.

It is to be appreciated that the supplemental information may be processed in association with other factors, as outlined herein, by the aggregation server 110 for selecting content for broadcast. For example, a priority for the user's 216 video may be assigned based on a creator rating, subject, genre, requested time slot or the like. Thus, in some embodiments, even if the satellite receiver 212A provides supplemental information requesting broadcast of the user's 216 video over the satellite 206, the aggregation server 110 may still broadcast the video over the satellite 208 if the aggregation server 110 is unable to accommodate the request by the user 216. This could happen for example if the priority of the user's 216 video is less than videos of other users that have requested broadcast of their videos over a channel carried on the satellite 208.

In at least one embodiment, a user 216 may provide a contact list in association with uploading content to the aggregation server 110. For example, take the situation where the contact list for the user 216 specifies the users 218 and 220. The aggregation server 110 may process the contact list to notify the members of the contact list when the associated content is to be broadcast over the satellite distribution network 200. For example, the aggregation server 110 may initiate delivery of messages to the satellite receivers 212B and 212C, notifying the users 218 and 220 regarding the broadcast time of the video. In at least one embodiment, the satellite receivers 212B and 212C provide a popup message to the users 218 and 220 as a reminder of the broadcast time.

In some embodiments, the messages to the satellite receivers 212B and 212C may include a recording command, requesting/instructing the satellite receivers 212B and 212C to record the selected video at the specified broadcast time. The recording command may be processed and executed automatically by the satellite receivers 212B and 212C without intervention by the users 218 and 220. In at least one embodiment, the satellite receivers 212B and 212C may solicit input from the users 218 and 220 approving the recording commands before execution.

In some embodiments, messages may not be sent to members of the contact list if the are unable to receive the referenced content. For example, the video of the user 216 may be broadcast via a channel carried on the satellite 206. Thus, the user 220 will be unable to receive the video via the satellite receiver 212C and the aggregation server 110 may process profile data of the users 218 and 220 to determine whether to transmit a message to each user 218 and 220. In the illustrated embodiment, the aggregation server 110 determines that the user 220 will be unable to receive the content and does not transmit a message to the user 220.

While the aggregation server 110 may transmit messages with the satellite distribution network 200, the aggregation server 110 may also transmit reminder messages to the contact list members via other communication networks, such as email or wireless telephone networks. For example, the aggregation server 110 may initiate transmission of short message service (SMS) messages to wireless telephones associated with the users 218 and 220 specifying the broadcast time of the user's 216 video. Similarly, the aggregation server 110 may initiate delivery of emails or the like to communication devices associated with the users 218 and 220.

While FIG. 2 illustrates user generated content and/or media content being transmitted via a satellite distribution network 200, it is to be appreciated that similar distribution techniques may be utilized to transmit content over cable distribution networks, IPTV networks, terrestrial OTA networks and the like. In any of these embodiments, an aggregation server may receive supplemental information, from a user uploading content, specifying the channels from which the user's communication device is capable of receiving. Thus, the aggregation server may process the supplemental information to accommodate delivery of the content, if possible, as requested by the user uploading the content.

Figure 3:
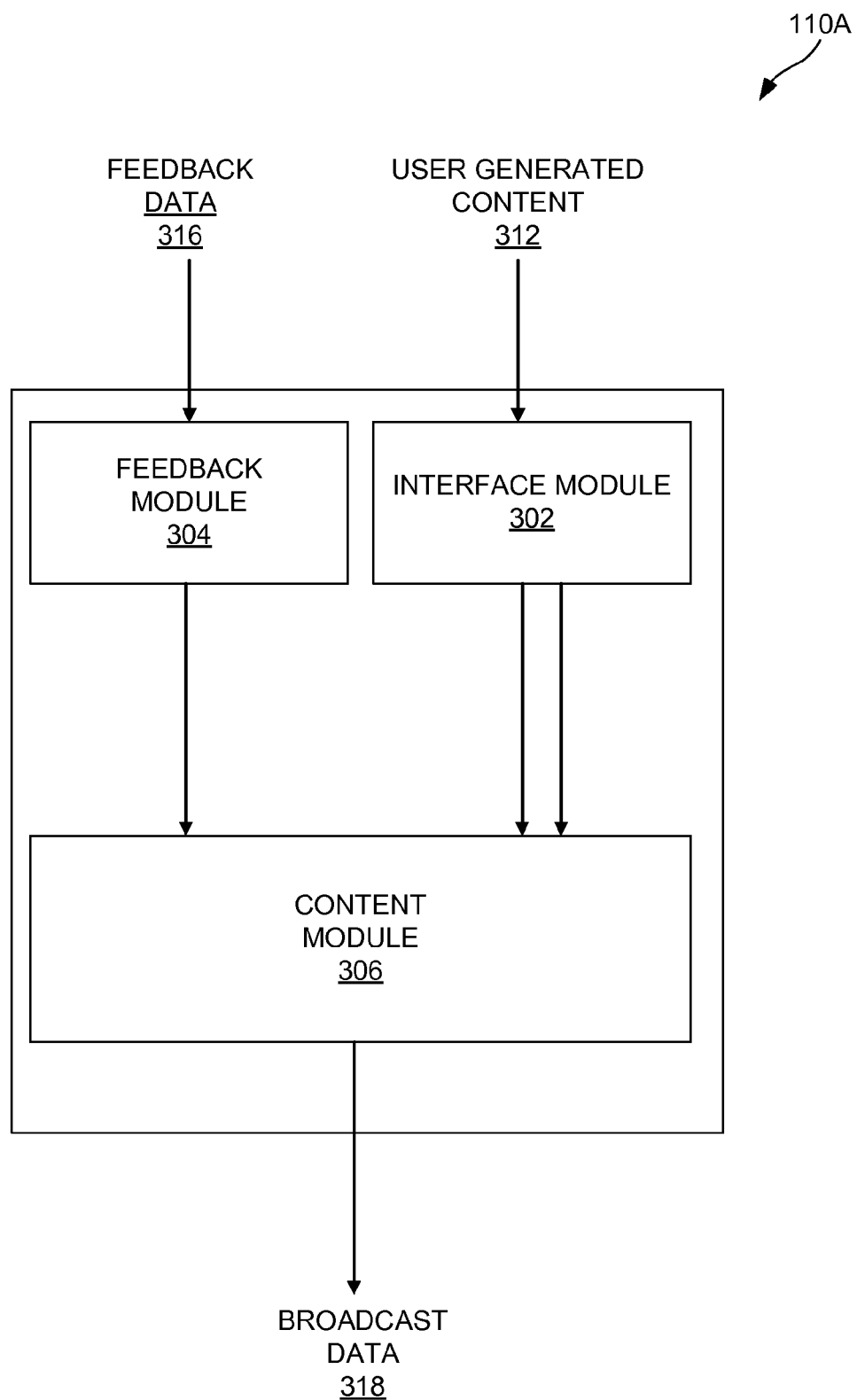
FIG. 3 illustrates one embodiment of functional components of the aggregation server of FIG. 2.

FIG. 3 illustrates one embodiment of functional components of aggregation server 110 of FIG. 2. FIG. 3 will be discussed in reference to satellite distribution network 200 illustrated in FIG. 2. Aggregation server 110A comprises interface module 302 operable for receiving user generated content 312 from a plurality of users 216, 218 and 220 (see FIG. 2). Interface module 302 may comprise a web server or any other type of interface for receiving video and other data uploads and transmissions from the satellite receivers 212A-212C or other communication devices, such as computers, mobile telephones, PDAs video game consoles and the like. For example, user 218 may upload user generated content 312 as an MPEG video to the interface module 302 using a web page provided by interface module 302. In at least one embodiment, the user 216 may upload user generated content 312 via an application operating on the satellite receiver 212A.

It is to be appreciated that other techniques may also be utilized to capture user generated content 312. For example, the satellite receiver 212A or a wireless telephone may be operable to capture and transmit streaming data to interface module 302 (e.g., using a video camera capturing content in real-time). Any of the satellite receiver 212A-212C may also be operable to provide an editing module for users 216, 218 and 220 to modify the stream of data transmitted to interface module 302 once the capturing process is complete.

Aggregation server 110A also comprises a feedback module 304 operable for receiving feedback data 316 responsive to presentation of the content. For example, the feedback module 304 may provide videos via a web interface where users may provide feedback data 316 regarding the videos. In at least one embodiment, a satellite receiver 212A-212C presents videos to a user 216, 218 or 220 and receives feedback from the user 216, 218, 220. The satellite receiver 212A-212C then transmits the feedback data 316 to the feedback module 304.

Aggregation server 110A further comprises content module 306 operable to receive feedback data 316 from feedback module 304 and user generated content 312 from interface module 302 and generate broadcast data 318 for transmission to the satellite receivers 212A-212C. Content module 306 may be operable to generate the broadcast data 318 in multiple formats, each appropriate for presentation by different types of devices. For example, the content may be transmitted to a television, a mobile communication device and/or a computer. Thus, each of television, a mobile communication device or a computer may receive a format of the broadcast data 318 for presentation within the capabilities of the device.

In at least one embodiment, the content module 306 utilizes the feedback data 316 to assign priorities to the user generated content 312. The priorities are then utilized by the content module 306 to identify broadcast times for the user generated content 312. For example, the content module 306 may utilize the feedback data 316 regarding a user's previously uploaded videos to assign a broadcast priority to recently uploaded user generated content 312. Thus, if viewers have liked the creator's previously uploaded videos, then the user generated content 312 will be more likely to be broadcast and/or receive a more desirable time slot. The content module 306 may process other factors, such as a subject/genre of the user generated content, to identify a broadcast time of the user generated content 312, depending on desired design criteria.

Those of ordinary skill in the art will appreciate that the various functional elements 302 through 306 shown as operable within aggregation server 110A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the aggregation server 110A.

Figure 4:
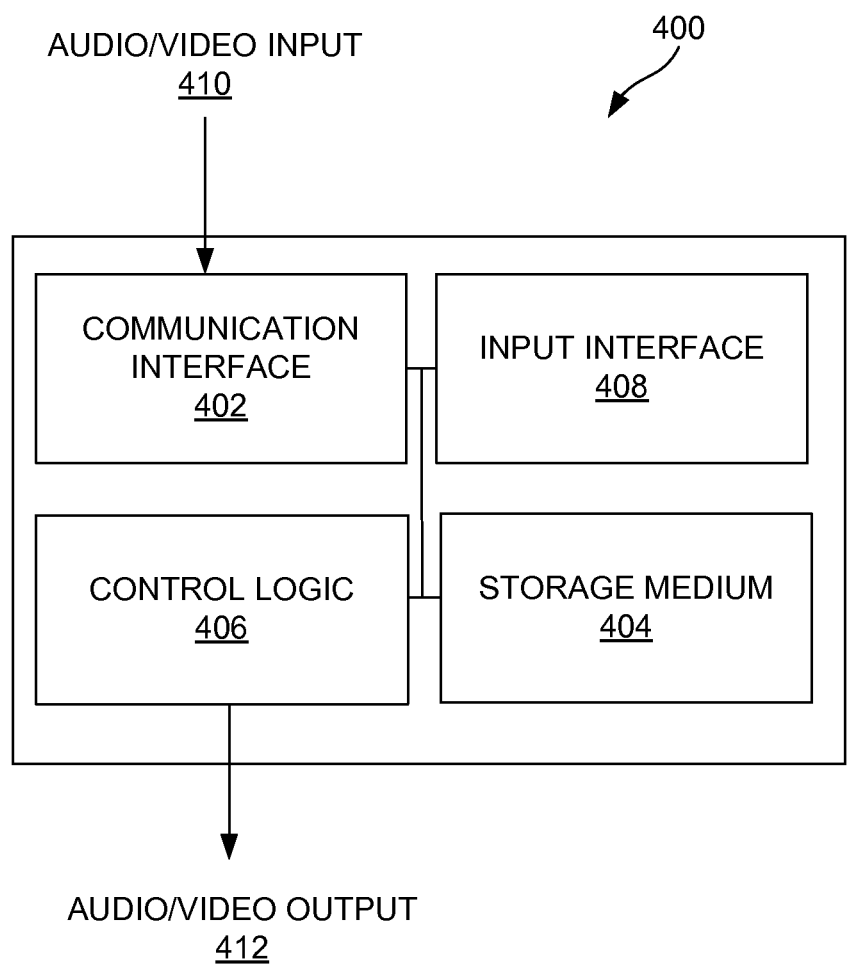
FIG. 4 illustrates an embodiment of a television receiver.

FIG. 4 illustrates an embodiment of a television receiver FIG. 4 will be discussed in reference to the satellite distribution network 200 illustrated in FIG. 2. However, it is to be appreciated that the television receiver 400 may be utilized with an over-the-air (OTA) transmission system, a cable television transmission system or an internet protocol television (IPTV) transmission system through the use of an appropriate communication interface (e.g., a tuner). The television receiver 400 includes a communication interface 402, control logic 406, an input interface 408 and a storage medium 404. Each of these components will be discussed in greater detail below. The satellite receiver 400 may include other elements, components or devices which are not illustrated for the sake of brevity.

The communication interface 402 is operable to receive an audio/video input 410 from a satellite antenna 210A-210C. In at least one embodiment, the communication interface 402 may comprise multiple tuners, utilized by the television receiver 400 to output and/or record multiple television programs simultaneously.

The storage medium 404 is operable to persistently store video signals recorded by the television receiver 400. The storage medium 404 may comprise any type of non-volatile memory appropriate for storing video signals recorded by the television receiver 400. Exemplary storage mediums 404 include hard drives (e.g., magnetic memory), flash memory, battery backed up memory and the like. In at least one embodiment, the storage medium 404 may be internally located within the television receiver 400. In other embodiments, the storage medium 404 may be located external with respect to the television receiver 400. The television receiver 400 may also utilize a combination of internal and external storage mediums 404 for storage of video signals.

The input interface 408 is operable to wirelessly receive data from a remote control (not shown in FIG. 4). The input interface 408 may communicate with a remote control utilizing any type of IR or RF communication link. In at least one embodiment, the input interface 408 receives a key code from a remote control (not shown in the Figures) and responsively provides the key code to the control logic 406 for processing. In some embodiments, the input interface 408 may receive positional information from a scrolling device of the remote control, e.g., a touch pad, scroll wheel or the like. The data received from the remote control may be utilized by the control logic 406 to control the output of content by the control logic 406. Some of the data received by the input interface 408 may request to view electronic programming guide data, menus and the like.

The control logic 406 is operable to control the operation of the television receiver 400. The control logic 406 may be a single processing device or a plurality of processing devices that cooperatively operate to control the operation of the television receiver 400. The control logic 406 may include various components or modules for processing and outputting audio/video content. Exemplary components or modules for processing audio/video content include a demodulator, a decoder, a decompressor, a conditional access module and a transcoder module.

The control logic 406 coordinates storage of the audio/video input 410 onto the storage medium 404. More particularly, the control logic 406 operates responsive to recording timers configured on the television receiver 400 to command the communication interface 402 to receive content from a specified channel and coordinates storage of the content onto the storage medium 404.

In at least one embodiment, the control logic 406 is operable to generate an audio/video output 412 based on the audio/video input 410, e.g., pass through the signal for display by an associated presentation device. The control logic 406 is also operable to retrieve stored video content from the storage medium 404 to generate an audio/video output 412 for display by a display device (e.g., display device 214A-214C). The presentation device then presents the audio/video output 412 to a user. The control logic 406 may incorporate circuitry to output the audio/video streams in any format recognizable by the presentation device 108, including composite video, component video, Digital Visual Interface (DVI), High-Definition Multimedia Interface (HDMI), 1394 and WiFi. The control logic 406 may also incorporate circuitry to support multiple types of these or other audio/video formats. In at least one embodiment, as described above, the television receiver 400 may be integrated with a presentation device (e.g., display device 214A-214C), and the control logic 406 may be operable to control the presentation of the audio/video output 412 by the presentation device.

In at least one embodiment, the control logic 406 is operable to present electronic programming guides and other menus that allow a user 216, 218 and 220 to select various programming for viewing. As described above, a satellite or cable television provider may dedicate one or more channels of their service to broadcasting user generated content. In at least one embodiment, user generated content may be grouped together by genre/subject, with like content being broadcast in similar timeslots.

Figure 5:
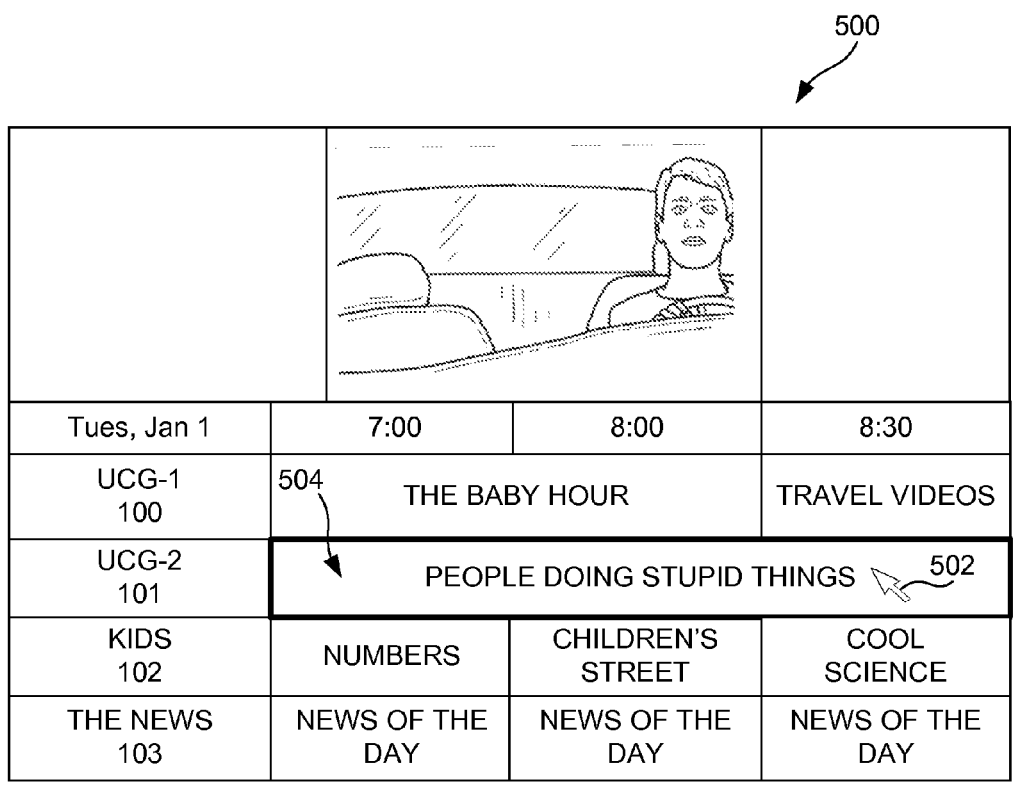
FIG. 5 illustrates an embodiment of an electronic programming guide (EPG) outputted by the control logic of FIG. 4.

FIG. 5 illustrates an embodiment of an electronic programming guide (EPG) 500 outputted by the control logic 406 of FIG. 4. As illustrated in the EPG 500, there are two channels, 100 and 101, dedicated to showing user generated content. Because many user generated videos are short in length, e.g., less than the typical half hour or hour time slot, like videos may be grouped together by subject. For example, videos showing babies may be grouped together in the time slot from 7:00 to 8:00 on channel 100. Similarly, travel videos may be grouped together in an adjacent time slot from 8:30 to 9:00.

The timeslots may show many different videos, each having varying lengths. For example, some baby videos may be 30 seconds or less in length, whereas other videos may be several minutes in length. Any number of user videos may be broadcast in a designated time slot, depending on the available time to show such videos. For example, if each video averaged one minute in length, then an hour time slot could broadcast 60 videos, if no commercial breaks are interspersed in between.

As illustrated in FIG. 5, the layout of EPG 500 does not provide enough granularity to view specific videos that are broadcast within a specified time slot. However, such granularity can be provided within an EPG, such that a user can view the exact time within a time slot for which a desired video is to be shown and/or set the television receiver 400 to record the desired video. For example, a user may utilize the cursor 502 to select the cell 504 corresponding with the program "People Doing Stupid Things." In response to selection of the cell 504, the control logic outputs a more granular schedule 600 for a particular time slot as illustrated in FIG. 6.

As illustrated in FIG. 6, the schedule 600 shows each user generated video to be broadcast during the relevant timeslot. By viewing the schedule 600, a user can see exactly what time a particular video will be shown. Thus, the user does not need to view all one and a half hours of programming in the time slot waiting for a desired video to come on. Additionally, a user can select to record a particular video rather than an entire time slot. Therefore, the user can view just the desired video at a subsequent time and/or save the desired video for later viewing without wasting space on the storage medium 404 storing content that they do not desire to view.

Figure 7:
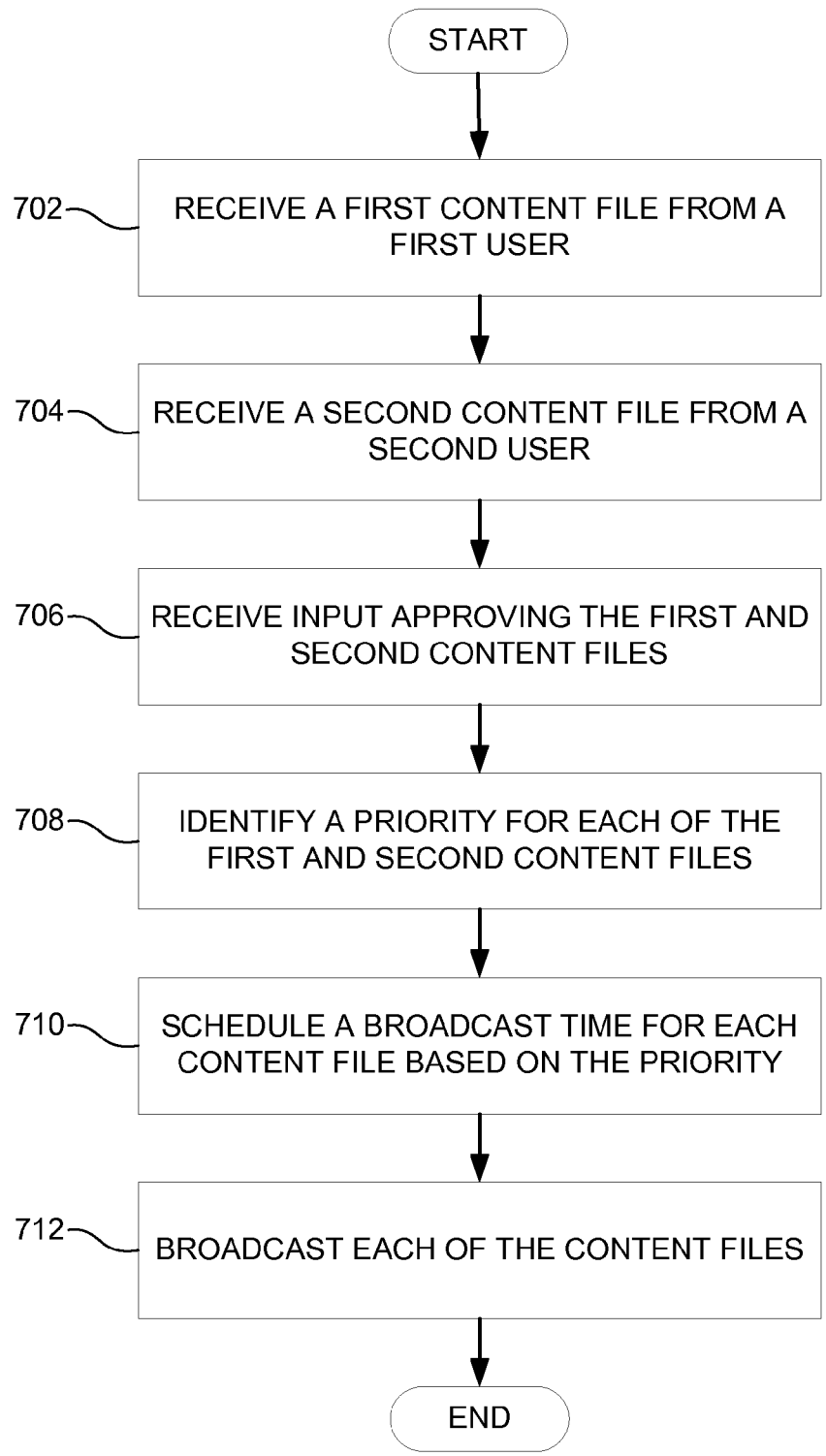
FIG. 7 illustrates an embodiment of a process for distributing video.

FIG. 7 illustrates an embodiment of a process for distributing video. More particularly, FIG. 7 illustrates a process for receiving and distributing user generated content and/or independent films. The process of FIG. 7 may include other operations not illustrated for the sake of brevity.

The process includes receiving a first content file from a first user (operation 702). The first content file may be received from any source, such as a web interface or via a mobile telephone or television receiver application. In some embodiments, a user may provide supplemental information in association with the content file, such as a description, genre, creator, director, actors and the like, describing attributes of the content. The user may also provide other supplemental information in association with the content, such as a user contact list, a channel transmission request and the like.

The process further includes receiving a second content file from a second user (operation 704). Operation 704 may be performed similarly to operation 702 and additional description of the operation is omitted herein.

The process further includes receiving user input approving each of the plurality of content files for broadcast through a communication network (operation 706). For example, an operator of a television provider may review each content file for objectionable material and/or other factors and approve or reject the content for broadcast. In at least one embodiment, the operator may additionally describe and/or categorize the content into appropriate categories for grouping during broadcast.

The process further includes identifying a priority for each content file based on associated attributes for the content file (operation 708). For example, a category of the content may be used to determine the priority of the content. In at least one embodiment, the priority for the content may be identified based on input of the aforementioned operator. As described above, creator ratings of the creator and/or user uploading the content may also be utilized to identify the priority.

The process further includes scheduling a broadcast time for each content file based on the priority (operation 710). For example, content assigned a higher priority may be broadcast more often and/or at more desirable times. In at least one embodiment, the broadcast time is determined based on a category/genre associated with the content. For example, baby videos may be shown during a particular time slot and sports videos during another time slot.

The process further includes broadcasting each of the content files through the communication network at the identified broadcast time for the content file (operation 712). Communication devices of users receive the broadcasted content and output the content for presentation. Thus, user generated content is broadcasted over a more traditional television channel and available to a wider audience than previously available for such independently created content.

Although specific embodiments were described herein, the scope of the invention is not limited to those specific embodiments. The scope of the invention is defined by the following claims and any equivalents therein.

We claim:

1. A method for distributing content, the method comprising:
   receiving a first content file, at an aggregation server, from a first user;
   receiving a second content file, at the aggregation server, from a second user;
   scheduling a broadcast time for each of the content files based on attributes associated with the content files wherein scheduling the broadcast time further comprises:
      receiving at the aggregation server from a particular television receiver, in association with the first content file, supplemental information comprising a switch matrix associated with the particular television receiver identifying at least one of a plurality of broadcast television channels receivable by the particular television receiver;
      identifying a priority for the first content file;
      scheduling the broadcast time of the first content file based on the priority, wherein the priority is assigned to the first content file at least based upon a predetermined rating that is associated with the first user; and
      identifying one of the plurality of television channels upon which to broadcast the first content file based on the supplemental information; and
   broadcasting each of the content files across a communication network by transmitting each content file at the scheduled broadcast time for each of the content files.

2. The method of claim 1, further comprising:
   receiving user input, at the aggregation server, approving the broadcasting of each of the content files.

3. The method of claim 1, wherein scheduling the broadcast time further comprises:
   receiving at least one attribute describing the first content file from the first user;
   grouping the first content file into at least one group with other content files based on the attribute; and
   broadcasting the content files of the at least one group in a common time slot.

4. The method of claim 1, further comprises:
   receiving a contact list, in association with the first content file; and
   transmitting a message to a communication device of each user of the contact list, the message specifying the broadcast time for the first content file.

5. The method of claim 4, wherein transmitting the message further comprises:
   transmitting a recording command to the communication device for each user of the contact list, the recording command instructing the communication device to record the first content file at the broadcast time.

6. A satellite distribution system comprising:
   an aggregation server operable to:
      receive a plurality of content files from a plurality of users;
      receive user input approving each of the plurality of content files for broadcast;
      schedule a broadcast time for each content file based on attributes of each of the plurality of content files wherein scheduling the broadcast time further comprises:
         receiving from a particular television receiver supplemental information for a first of the plurality of content files, the supplemental information comprising a switch matrix associated with the particular television receiver identifying at least one of a plurality of television channels receivable by the particular television receiver;
         identifying a length or duration of the first of the content files, or a subject or genre type of the first of the content files;
         scheduling the broadcast time of the first content file based on the length or duration, or on the subject or genre type; and
         identifying one of the plurality of television channels upon which to broadcast the first content file based on the supplemental information; and
      an uplink system operable to:
         receive the plurality of content files from the aggregation server; and
         transmit each of the plurality of content files to a satellite at the scheduled broadcast time, the satellite distributing the content files to multiple communication devices for viewing by users.

7. The satellite distribution system of claim 6, wherein the attribute for each content file identifies a creator of the content file and wherein scheduling the broadcast time further comprises:
   identifying user feedback received by the aggregation server regarding other videos created by a first user providing the first of the content files; and
   scheduling the broadcast time of the first content file based on the user feedback.

8. The satellite distribution system of claim 6, wherein:
   the uplink system communicates with a plurality of satellites;
   the aggregation server receives supplemental information in association with the first of the content files from a first user, the supplemental information identifying at least one of the satellites from which the communication device of the first user is capable of receiving data; and
   the aggregation server schedules the first content file for transmission on the satellite identified by the supplemental information.

9. The satellite distribution system of claim 6, wherein the aggregation server is operable to:
   receive a contact list, in association with a first of the plurality of content files; and
   transmit a message to a communication device of each user of the contact list, the message specifying the broadcast time for the first content file.

10. The satellite distribution system of claim 9, wherein the aggregation server is operable to transmit a recording command to the communication device for each user of the contact list, the recording command instructing the communication device to record the first content file at the broadcast time.

11. A method for distributing content, the method comprising:
    receiving a first content file, at an aggregation server, from a first user;
    receiving a second content file, at the aggregation server, from a second user;

scheduling a broadcast time for each of the content files based on attributes associated with the content files wherein scheduling the broadcast time further comprises:
   receiving at the aggregation server from a particular television receiver, in association with the first content file, supplemental information comprising a switch matrix associated with the particular television receiver identifying at least one of a plurality of broadcast television channels receivable by the particular television receiver;
   identifying a priority for the first content file;
   scheduling the broadcast time of the first content file based on the priority, wherein the priority is assigned to the first content file at least based upon a predetermined rating that is associated with the first user and a financial compensation provided by the first user to raise priority assigned to the first content file; and
   identifying one of a plurality of television channels upon which to broadcast the first content file; and
broadcasting each of the content files across a communication network by transmitting each content file at the scheduled broadcast time for each of the content files.

\* \* \* \* \*